United States Patent [19]

Ezell

[11] Patent Number: 4,629,534
[45] Date of Patent: Dec. 16, 1986

[54] FRACTIONAL DISTILLATION APPARATUS AND METHOD

[75] Inventor: Emory L. Ezell, Sweeny, Tex.

[73] Assignee: Phillips Petroleum Company, Bartlesville, Okla.

[21] Appl. No.: 722,649

[22] Filed: Apr. 12, 1985

[51] Int. Cl.$^4$ .............................................. B01D 3/32
[52] U.S. Cl. ........................................ 203/98; 203/99; 196/100; 196/111; 202/153; 202/158; 261/114.1; 261/114.5
[58] Field of Search ...................... 202/153, 158, 159; 261/114 TC, 114 R; 196/130, 131, 98–100, 111; 203/99, DIG. 22

[56] References Cited

U.S. PATENT DOCUMENTS

| | | | |
|---|---|---|---|
| 2,071,643 | 2/1937 | Maker | 196/100 |
| 2,534,173 | 12/1950 | Kraft | 202/153 |
| 2,795,536 | 6/1957 | Grossberg et al. | 202/153 |
| 3,309,295 | 3/1967 | Cahn et al. | 202/153 |
| 3,442,767 | 5/1969 | Hall | 203/2 |
| 3,766,021 | 10/1973 | Randall | 203/39 |
| 4,036,918 | 7/1977 | Morgan et al. | 202/158 |
| 4,129,626 | 12/1978 | Mellbom | 261/114 TC |
| 4,490,215 | 12/1984 | Bannon | 203/98 |

Primary Examiner—Wilbur Bascomb
Attorney, Agent, or Firm—William R. Sharp

[57] ABSTRACT

An apparatus and method are provided for the fractional distillation of liquids in a fractionation column wherein cool liquids from the bottom tray of the column are effectively prevented from passing out directly with bottoms product before first passing through a reboiler. The column is of the type which includes a hollow shell having a surge baffle plate which divides a bottom portion of the shell interior into a first region and a second region. A separation baffle plate is provided which extends into the first region. At least one seal pan whose bottom is closely adjacent to the upper edge of the separation baffle receives liquids flowing from the bottom tray by means of a downcomer. The seal pan includes at least one side wall, perpendicular to the separation baffle plate, which is structured to direct substantially all liquid overflowing therefrom into a third region defined between one surface of the separation baffle plate and the shell interior surface, the overflowing liquid then flowing into the above defined first region. Liquid in the first region is withdrawn and passed through a reboiler, which discharges heated fluids. These heated fluids are introduced into the shell from a position adjacent to a fourth region on the opposite side of the separation baffle plate with respect to the third region. Liquid in the second region is withdrawn as bottoms product.

24 Claims, 8 Drawing Figures

1. A process for recovering 3-methyl-1-butene from a hydrocarbon stream containing 3-methyl-1-butene and compounds which form azeotropes with 3-methyl-1-butene comprising: extractive distillation of said hydrocarbon stream with a solvent mixture comprising dimethylformamide and sulfolane said solvent mixture present in an amount ranging from about 0.1 to about 20 times the weight of said hydrocarbon stream, where said dimethylformamide in the dimethylformamide/Sulfolane solvent mixture is present in an amount ranging from about 30 weight percent to about 70 weight percent based on the weight of said mixture, thereby separating insolubles containing said 3-methyl-1-butene as the overhead product stream from the bottoms product containing soluble compounds, the compounds that form azeotropes with 3-methyl-1-butene and the solvent mixture and thereafter recovering said 3-methyl-1-butene from said insolubles.

2. A process according to claim 1 where said hydrocarbon stream contains amylenes.

3. A process according to claim 2 where said hydrocarbon stream is a C$_5$-cut from a heavy gas oil catalytic cracking stream.

4. A process according to claim 3 where said stream contains 2-butyne.

5. A process according to claim 1 where said contacting takes place at a temperature ranging from about 100° C. to about 300° C. for about 0.1 to about 30 minutes.

6. A process according to claim 1 where the solvent mixture is recovered, treated with water, separated from the soluble hydrocarbons, and reconstituted for reuse.

7. A process according to claim 1 where said 3-methyl-1-butene is recovered by distillation.

8. A process according to claim 1 where said dimethylformamide comprises about 50 weight percent of said solvent mixture.

* * * * *

FRACTIONAL DISTILLATION APPARATUS AND METHOD

BACKGROUND OF THE INVENTION

This invention relates to an apparatus and method for the fractional distillation of liquid mixtures.

Fractional distillation is widely employed for the separation of liquid mixture components (i.e. hydrocarbons) of different boiling points. Such fractional distillation is normally carried out in a fractionation column. The feed material is usually fed into the approximate mid-section of the column, the feed material thereafter separating into a vapor phase and a liquid phase. The vapor phase passes out of the upper section of the column and a portion of the vapor phase is condensed and returned to the column as reflux. The liquid phase flows down the column through a plurality of trays, and at least a portion of the liquid phase is withdrawn from the column bottom as the bottoms product. Another portion of the liquid which accumulates at the column bottom is withdrawn, heated in a reboiler, and returned to the column.

A problem which arises in fractionation columns for fractional distillation of oils involves cold liquids from the bottom tray bypassing the reboiler and being withdrawn with the bottoms product. The bottom tray liquids contain a greater concentration of light hydrocarbon impurities than the reboiler return liquids. Thus, bottom tray liquids which are yielded directly as bottoms product without passing through the reboiler raises the light hydrocarbon impurity level of the bottoms product. This must be compensated for by overheating liquids passing through the reboiler so as to waste a considerable amount of energy.

One attempt to solve the above problems is described in U.S. Pat. No. 2,795,536 of Grossberg et al. Grossberg et al employs a vertical baffle plate to assist in directing cool liquid from the bottom tray to a pool from which liquid is withdrawn and passed to a reboiler. This insures that the liquid from the bottom tray passes through the reboiler at least once before being yielded out with bottoms product.

More specifically, Grossberg et al discloses the use of a downspout plate for receiving a flow of liquid therealong from a bottom tray. A cup member is provided in conjunction with the lower end of the downspout plate to provide the desired liquid seal to prevent gases passing up and around the downspout plate. The orientation of the above mentioned vertical baffle plate and the construction of features, such as the cup member, associated therewith require that a separate baffle plate must be provided for each cup member and associated downspout plate to achieve the above discussed result wherein substantially all liquids coming directly from the bottom tray are prevented from being passed out of the column as bottoms product. Thus, in a multipass system a number of baffle plates are required which increases expense and complexity of construction.

SUMMARY OF THE INVENTION

It is, therefore, an object of the invention to provide a fractional distillation apparatus and method capable of effectively separating liquid mixture components.

It is also an object of the invention to provide a fractional distillation apparatus and method which effectively prevents substantially all cool liquids flowing directly from the bottom tray thereof from passing out with the bottoms product.

It is yet another object of the invention to provide an apparatus and method for performing fractional distillation wherein substantially all liquids flowing from the bottom tray in a fractionation column pass through a reboiler at least once before being returned to the column.

It is a further object o: the invention to provide an apparatus and method of fractional distillation wherein the above objects are accomplished, and wherein only one separation baffle plate is required to accomplish those objects in a multipass fractionation system.

The above objects are realized in a fractional distillation apparatus of the type which includes a vertical hollow shell, at least a bottom tray within the shell, at least one downcomer associated with the bottom tray for receiving fluid therefrom, a surge baffle plate which extends from the bottom end of the shell to an upper edge so as to separate a bottom portion of the shell into a first region and a second region, a reboiler, a first outlet for withdrawing liquids therethrough from the first region to be introduced to the reboiler, and a second outlet for withdrawing liquids therethrough from the second region as bottoms product, wherein the improvement includes a separation baffle plate, at least one seal pan, and a shell inlet for reboiler heated return fluids, the combination of which effectively prevents bottom tray cool liquids from flowing directly into the second region to be yielded out as bottoms product. The separation baffle plate is substantially vertically oriented and extends into the first region such that a lower edge of the separation baffle is vertically positioned below the surge baffle upper edge, and wherein an upper edge of the separation baffle is vertically positioned above the surge baffle upper edge. At least one seal pan is provided for receiving liquid flowing from the downcomer. The seal pan comprises a bottom wall directly overlying and closely adjacent to at least a portion of the separation baffle upper edge. The seal pan also comprises at least one side wall being generally perpendicular to the separation baffle and having an upper edge at least a portion of which defines an overflow weir. The side wall is structured so as to direct substantially all liquid overflowing from the seal pan to a third region defined between a first surface of the separation baffle and the shell interior surface, the overflowing liquid then flowing into the first region. A shell inlet is provided for receiving heated fluids discharged from the reboiler, wherein the inlet is vertically spaced above the surge baffle upper edge, below the seal pan, and is positioned closely adjacent to and in fluid communication with a fourth region defined between a second separation baffle surface, opposite the first surface, and the shell interior surface.

According to another aspect of the invention, there is provided an apparatus for use in a fractionation column which includes a plate, having at least one edge, and at least one pan. The pan comprises a bottom wall having first and second opposing surfaces, wherein at least a portion of the plate edge is in contact with the bottom wall at the first surface such that the bottom wall is generally perpendicular to the plate. The pan also comprises at least one side wall connected to the bottom wall and extending from the bottom wall second surface to a side wall edge. The side wall is oriented so as to be generally perpendicular to the plate. Additionally, the side wall includes two side wall portions having respective edges which together constitute the side wall edge. One side wall portion has a height as measured along a line parallel to the plate and side wall less than the height of the other side wall portion. According to embodiments disclosed herein, the plate is employed as a separation baffle plate, and the pan is employed as a seal pan. The separation baffle plate can be comprised of one or a plurality of plate like components assembled to form a plate.

According to yet another aspect of the invention, a method for the fractional distillation of liquids in a fractionation column is provided. The fractionation column is generally of the type which includes a vertical hollow shell, a plurality of downcomers, and a surge baffle plate which extends from the shell bottom to an upper edge so as to divide a bottom portion of the shell interior into first and second regions. Liquids flowing each downcomer are introduced to a corresponding seal pan. Substantially all the liquids which overflow from the seal pans are directed to a third region defined between a first surface of separation baffle plate and the shell interior surface as defined above, the overflowing liquids then flowing into the first region. At least a portion of liquid in the first region is withdrawn and passed to a reboiler, where it is heated. The reboiler discharges heated fluids accordingly which are introduced into a fourth region as defined above, the heated fluids being introduced from a position located above the surge baffle upper edge and below the seal pans. At least a portion of liquid in the second region is withdrawn as bottoms product.

According to the present invention, cool liquids flowing directly from the bottom tray of a fractionation column are prevented from flowing directly out with bottoms product before first being passed through a reboiler. This effect can be accomplished according to the invention in a multipass fractionation system without the use of more than one baffle plate. This arrangement is far less expensive and complex than prior art fractionation systems such as that described above which require the use of multiple baffles in a multipass system.

BRIEF DESCRIPTION OF THE DRAWINGS

FIGS. 1-8, each of which is briefly described below, are schematic representations with construction details omitted for clarity.

FIG. 1 is a vertical cross-sectional view of a lower part of a fractionation column according to a first embodiment of the invention. The illustrated apparatus includes two seal pans, only one of which is shown in FIG. 1, and an associated separation baffle plate.

FIG. 2 is a horizontal cross-sectional view of the apparatus of FIG. 1 as viewed along line 2—2, wherein both seal pans are shown.

FIG. 3 is a vertical cross-sectional view of apparatus of FIG. 1 as viewed along line 3—3.

FIG. 4 is a pictorial view of the seal pans and associated separation baffle plate shown in FIGS. 1, 2 and 3.

FIG. 5 is a vertical cross-sectional view of the lower part of a fractionation column according to a second embodiment of the invention. The illustrated apparatus in FIG. 4 also includes two seal pans, only one of which is shown, and an associated separation baffle plate.

FIG. 6 is a horizontal cross-sectional view of the apparatus of FIG. 5 as viewed along line 6—6.

FIG. 7 is a cross-sectional view of the apparatus of FIG. 5 as viewed along line 7—7.

FIG. 8 is a pictorial view of the seal pans and associated separation baffle plate shown in FIGS. 5, 6 and 7.

DESCRIPTION OF THE PREFERRED EMBODIMENTS

Figure 4:
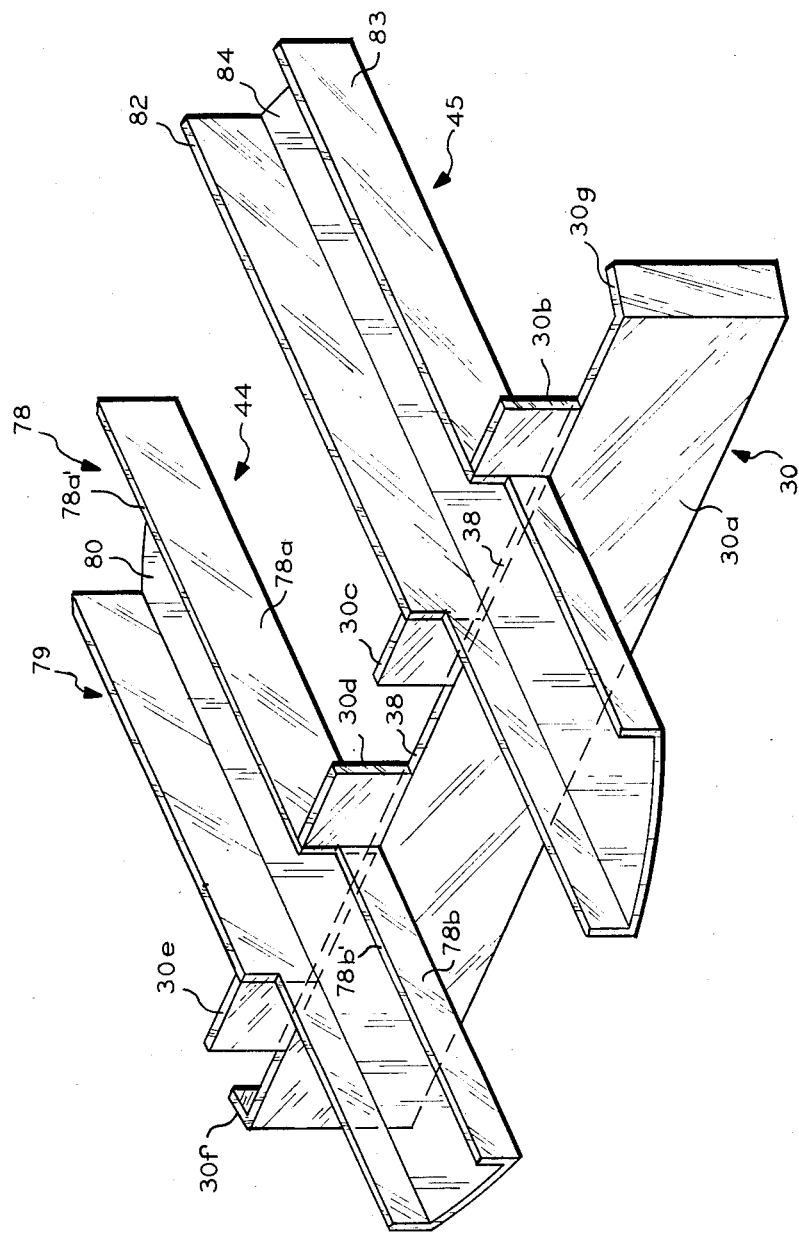

Two embodiments of the invention will now be described with reference to FIGURES. Only the bottom portion of the fractionation column is shown in each of FIGS. 1, 3, 5, and 7, since the upper portion of the column is not directly pertinent to the invention. It should be understood, however, that the upper portion of the column is provided with the usual feed and outlet connections. Additionally, various details not directly relevant to the invention such as inspection openings, weep holes etc. are not shown for the sake of clarity of illustration and ease of description.

Referring now to FIGS. 1 and 2, reference number 10 designates a vertical generally cylindrical hollow shell of a fractionation column for separating liquid mixtures, such as oil, into fractions having desired properties. As shown, shell 10 has an interior surface 12 and a bottom end shown generally at 14. A surge baffle plate 16 has a lower edge 18 secured by suitable means such as welding to the shell interior surface at the shell bottom end, the surge baffle extending upwardly to an upper edge 20 which defines an overflow weir. Although the surge baffle 16 shown in the illustrated embodiment includes several vertically oriented sections and several diagonally oriented sections, it should be apparent that other configurations are possible. In addition, surge baffle 16 extends substantially entirely across the interior of the shell so as to divide a bottom portion of the shell interior into two regions 22 and 24. Region 22 is defined between a surface 26 of surge baffle 16 and the interior surface 12 of the shell. Region 24 is defined between a surface 28, opposite surface 26, and the interior surface of the shell.

A vertical separation baffle plate 30, secured along opposite edges thereof to the interior surface of shell 10 as by welding so as to extend entirely across the interior of the shell, is positioned so as to be generally vertically oriented within shell 10. Baffle plate 30 has opposing surfaces 32 and 34, each of which extend from a lower edge 36 to an upper edge 38. A region 40 is defined between surface 32 and the interior surface of shell 10. Similarly, a region 42 is defined between surface 34 and the interior surface of shell 10. Baffle plate 30 extends into region 22 such that its lower edge 36 is vertically positioned below surge baffle upper edge 20 and so as to be positioned along its entire length in region 22, and wherein the upper edge 38 is vertically positioned above upper edge 20. Therefore, it should be apparent that regions 40 and 42 intersect and are partially coextensive with region 22. Region 42 also intersects and is partially coextensive with region 24. Additionally, it is preferred that the separation baffle plate 30 is oriented so that its surface 34 faces the surge baffle upper edge 20.

Two seal pans, 44 and 45, only one of which is shown in FIG. 1, are provided within shell 10. Each pan is slightly offset from the center of the shell interior, and has two horizontally spaced ends each of which is connected by suitable means to interior surface 12 of shell 10. Therefore, each seal pan generally horizontally extends across the interior of shell 10. Preferably, a portion of the upper edge 38 of separation baffle plate 30 is closely adjacent to the bottom of each seal pan 44. Most preferably, as shown, a portion of the upper edge 38 is in contact with the bottom of each seal pan. Also as shown, baffle plate 30 extends upward so as to partially surround the seal pans as discussed further below. As will be discussed in more detail with reference to FIG. 4, sidewalls of the seal pans are structured to direct substantially all the fluid overflowing the seal pans to region 40, such overflowing fluid then flowing into region 22.

A bottom tray 56 is shown in FIG. 1 which comprises a plate connected at opposite edges to the shell interior surface. Plate 56 preferably has holes (not shown) therethrough. Gases can pass through these holes as they travel up through the column. The plate 56 could be fitted with bubble caps (not shown) as known in the art to permit the upward gas flow. Downcomers 58 and 59 (only one of which is shown in FIG. 1) are provided, each of which comprises a hollow member which extends from a lower end positioned within the interior of its corresponding seal pan to an upper end which defines an overflow weir. Downcomers 58 and 59 serve to guide liquids from tray 56 to their respective seal pans 44 and 45. Of course, many trays which are not shown are typically stacked above the illustrated bottom tray to accomplish effective separation of liquid components.

The illustrated apparatus also includes a reboiler 62, preferably of the thermosyphon type, which has an inlet 64 and an outlet 66. Reboiler 62 has the capability of heating fluids admitted to the inlet 64 and discharging such heated fluids at outlet 66. Of course, reboiler 62 would in actual practice have some means (not shown) for introducing steam or some other hot fluid from which heat is transferred to the liquid being circulated through the reboiler.

A column outlet 68 is provided near and preferably at shell bottom 14 which is in fluid communication with region 22. Outlet 68 is also in communication with reboiler inlet 64 by means of conduit means 70. Thus, liquid from region Z2 may be withdrawn through outlet 68 and introduced to reboiler 62.

A column inlet 72 is provided which is vertically spaced above surge baffle upper edge 20 and below the seal pans. In addition, inlet 72 is closely adjacent to and in fluid communication with region 42. Inlet 72 is also in open communication with reboiler outlet 66 by means of conduit means 74 such that discharged heated fluid from reboiler 62 may pass into the shell interior through inlet 72. Most preferably, inlet 72 is horizontally positioned between baffle plate 30 and surge baffle upper edge 20. Such a position of the inlet 72 as described above permits return liquids from the reboiler to flow into region 22, yet at the same time separates the incoming turbulent fluids from the cool liquids flowing from the bottom tray. In actual practice, an additional inlet may be provided on the opposite side of the shell. Another column outlet 76 is provided at the bottom of the column so as to be in fluid communication with region 24. Bottoms product accumulating in region 24 can be withdrawn through outlet 76 accordingly.

Referring now to FIG. 3, there is shown a cross-sectional view of the apparatus of FIG. 1 which more clearly shows the structure of downcomers 58 and 59 and seal pans 44 and 45. As shown, each downcomer is a hollow member which generally converges from an upper end above tray 56 to a lower end which is positioned within its corresponding seal pan. In normal operation, liquid fills each seal pan such that the lower end of each downcomer is immersed in the liquid. This provides a liquid seal which effectively prevents undesirable passing of gases up through the downcomers rather than through the tray.

As shown, seal pan 44 includes two side walls 78 and 79, and a bottom wall 80 generally perpendicular to the side walls. Seal pan 45 is similarly constructed and has walls 82 and 83, and bottom wall 84. Upper edge 38 of separation baffle plate 30 is in contact with the bottom of the seal pans 44 and 45 at the bottom walls 80 and 84. Portions of the separation baffle plate 30 extend upward so as to surround the seal pans.

Referring now to FIG. 4, the structure of seal pans 44 and 45 and baffle plate 30 will now be described in more detail. Separation baffle plate 30 includes plate components 30a, 30b, 30c, 30d, and 30e. Components 30b, 30c, 30d and 30e can be welded or bolted to side walls 83, 82, 78, and 79 respectively. Wing-like components 30f and 30g are also provided, which can be displaced angularly as shown for attaching baffle plate 30 to the shell of the fractionator by welding. As an alternative to the above described construction, separation baffle plate 30 could be a single integral piece. As to the seal pans, the following description will be made with reference to seal pan 44, but it should be understood that seal pan 45 is substantially identical in construction. Bottom wall 80 has a lower surface in contact with a portion of upper edge 38 of separation baffle 30 such that the bottom wall is perpendicular to separation baffle 30 and such that upper edge 38 is positioned intermediate the horizontally spaced ends of seal pan 44. Side walls 78 and 79 are substantially parallel, and are substantially similar in construction except for overall length. With reference to side wall 78 for the purpose of illustration, side wall 78 is connected to bottom wall 80 and extends from the bottom wall to a side wall upper edge constituted by side wall upper edge portions 78a' and 78b'. Side wall 78 is generally perpendicular to separation baffle 30, and includes two side wall portions 78a and 78b having respective above mentioned upper edges 78a' and 78b'. As shown, side wall portion 78b has a height less than the height of side wall portions 78a, wherein height is measured along a line parallel to separation baffle 30 and side wall 78, such a line being vertical when the seal pan is oriented as in FIG. 1. Since side wall portion 78b is least in height, upper edge portion 78b' defines an overflow weir for seal pan 78.

Side wall portions 78a and 78b join at a location closely adjacent to the separation baffle. Referring back to FIG. 1, it can be seen that according to this construction side wall portion 78b directly overlies region 40. Therefore, substantially all liquid collected in seal pan 44 will tend to overflow from the upper edge of the side wall portion of lesser height, 78b, and into region 40, the overflowing liquid then flowing into region 22.

Operation of the apparatus shown in FIGS. 1–4 will now be described with reference to the FIGURES. As best shown in FIG. 3, cool liquids on bottom tray 56 flow over the upper end of each downcomer such that these downcomer upper ends function as overflow weirs. Liquids then flow through each downcomer 58 and 59 to respective seal pans 44 and 45.

As best shown in FIG. 2, substantially all liquids in the seal pans overflowing the seal pans flow over the upper edges of the side walls of lesser height. Thus, substantially all of these overflowing liquids flow into region 40, due to the positioning of separation baffle plate 30 with respect to the side wall portions. These liquids then flow into region 22, where such liquids, together with a portion of the reboiler return liquids as will be discussed, accumulate to form a pool. At least a portion of the liquid in region 22 is withdrawn through outlet 68 and passed to inlet 64 of reboiler 62 via conduit 70. Reboiler 62 heats the received liquids accordingly and discharges heated fluids through outlet 66 so as to pass through conduit 74. These heated reboiler return fluids are introduced into region 42 of the shell interior from inlet 72. The heated return fluids include a liquid component which flows into the pool in region 22. A portion of these return liquids overflow surge baffle plate 16 by means of overflow weir 20, these overflowing liquids accumulating in region 24 to form a second pool. Accumulated liquid in region 24 is withdrawn through outlet 76 as bottoms product.

Another portion of the heated return liquids flow under the lower edge 36 of separation baffle plate 30 and mix with cool liquids flowing downwardly from the seal pans. This mixture forms the accumulated liquid in region 22, a portion of which is withdrawn through outlet 68 for heating in reboiler 62. It should be noted that extension of separation baffle plate 30 only partially into region 22 permits at least some of the reboiler return liquids to be reintroduced to reboiler 62 which is preferable to obtain optimum separation of components.

As noted above, cool liquids overflowing the seal pans flow on one side (into region 40) of baffle plate 30, whereas reboiler return fluids are introduced into the shell interior from inlet 72 on the opposite side of baffle plate 30. In addition, as shown, the accumulated liquid pool in region 22 typically is maintained at a level even with the surge baffle plate upper edge 20. Since the lower edge 36 of separation baffle plate 30 is positioned below the upper edge 20, a lower portion of the separation baffle plate extends into the pool in region 22. Therefore, a liquid seal is provided between hot return fluids flowing from inlet 72 and the cool liquids flowing from the seal pans. Only a liquid seal is provided since, as previously discussed, separation baffle plate 30 extends only partially into region 22. This liquid seal effectively separates the cool bottom tray liquids from the hot reboiler return fluids flowing from inlet 72 so as to prevent such cool liquids from being entrained with the reboiler return fluids and thus at least partially flowing into region 24 to be withdrawn as bottoms product.

As already noted with respect to fractional distillation of oils, such effective prevention of cool bottom tray liquids passing directly out with the bottoms product reduces the concentration of light impurities (such as ethane in a deethanizer) in the bottoms product. It should be noted that this reduction of light impurity concentration is accomplished without requiring additional energy input to the reboiler, which amounts to a significant energy saving in obtaining a particular bottoms product purity. Another advantageous feature is increased fractionation column capacity (i.e. feed rate) for a desired product purity. Excessive vapor load to the bottom column trays is avoided due to the fact that there is no need to over-reboil liquids, as noted above, to obtain the desired bottoms product purity. Yet another advantageous feature is increased reboiler capacity for a desired product purity due to a larger MTD (Mean Temperature Difference). MTD is generally a function of the difference between the hot and cold side temperatures of the exchanger. The larger MTD is attained due to a colder reboiler inlet temperature. Substantially all of the cool bottom tray liquids are directed into the pool from which liquid is withdrawn and introduced to the reboiler, thus providing a colder reboiler inlet temperature.

Furthermore, a fractionation apparatus constructed according to the present invention permits the use of only one separation baffle plate in a multipass system. Such an arrangement is less expensive and less complex in construction than prior art systems requiring a plurality of separation baffles in a multipass system.

Figure 6:
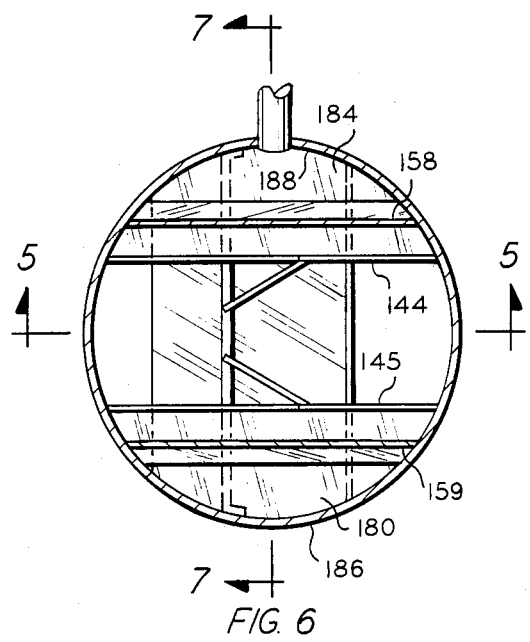
Figure 5:
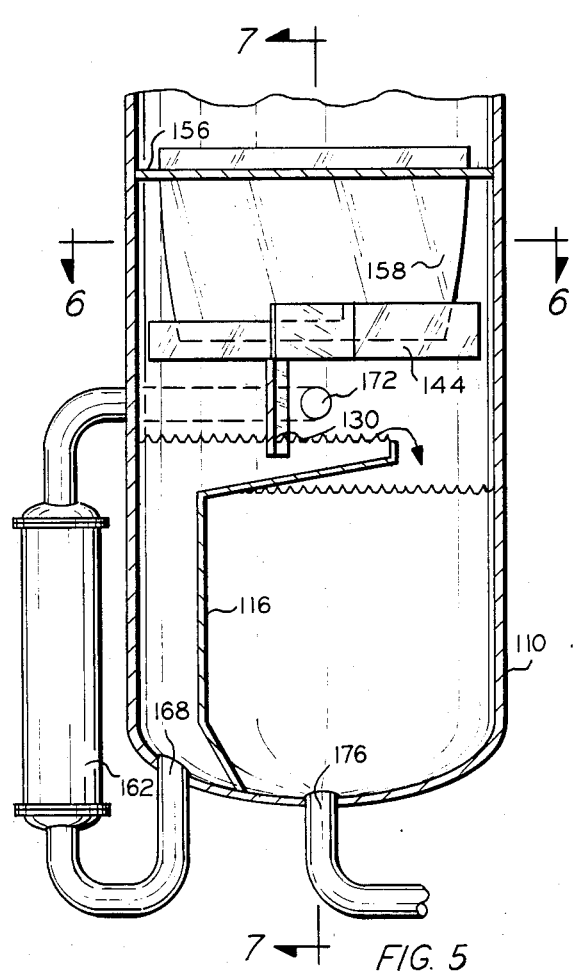

Referring now to FIGS. 5 and 6, another embodiment is shown having two seal pans and two downcomers associated with a bottom tray according to a modified form of construction. The apparatus includes a vertical shell 110, a surge baffle plate 116, a separation baffle plate 130, a reboiler 162, an inlet 172, and outlets 168 and 176 substantially similar to such elements as shown in FIGS. 1-3. Two seal pans, 144 and 145, are provided, which include respective bottom walls 180 and 184 having outer edges 186 and 188 connected to the interior surface of the shell. A bottom tray 156 is connected to two downcomers 158 and 159, wherein a side view of downcomer 158 is shown in FIG. 5, and wherein a cross-section of the both downcomers is shown in FIG. 6.

Figure 7:
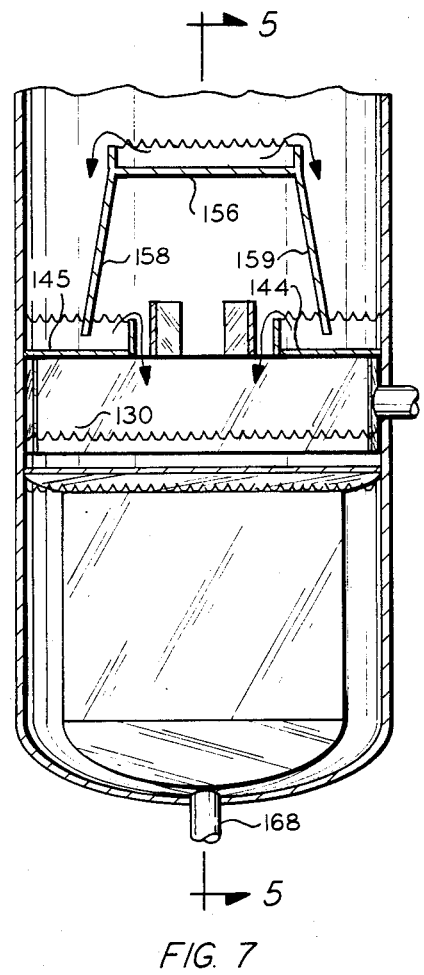

Referring to FIG. 7, each downcomer 158 and 159 is shown as comprising a slightly slanted plate connected at its upper end to tray 156, and wherein its lower end extends into its corresponding seal pan. The structure of the seal pans will be further discussed with reference to FIG. 8.

Figure 8:
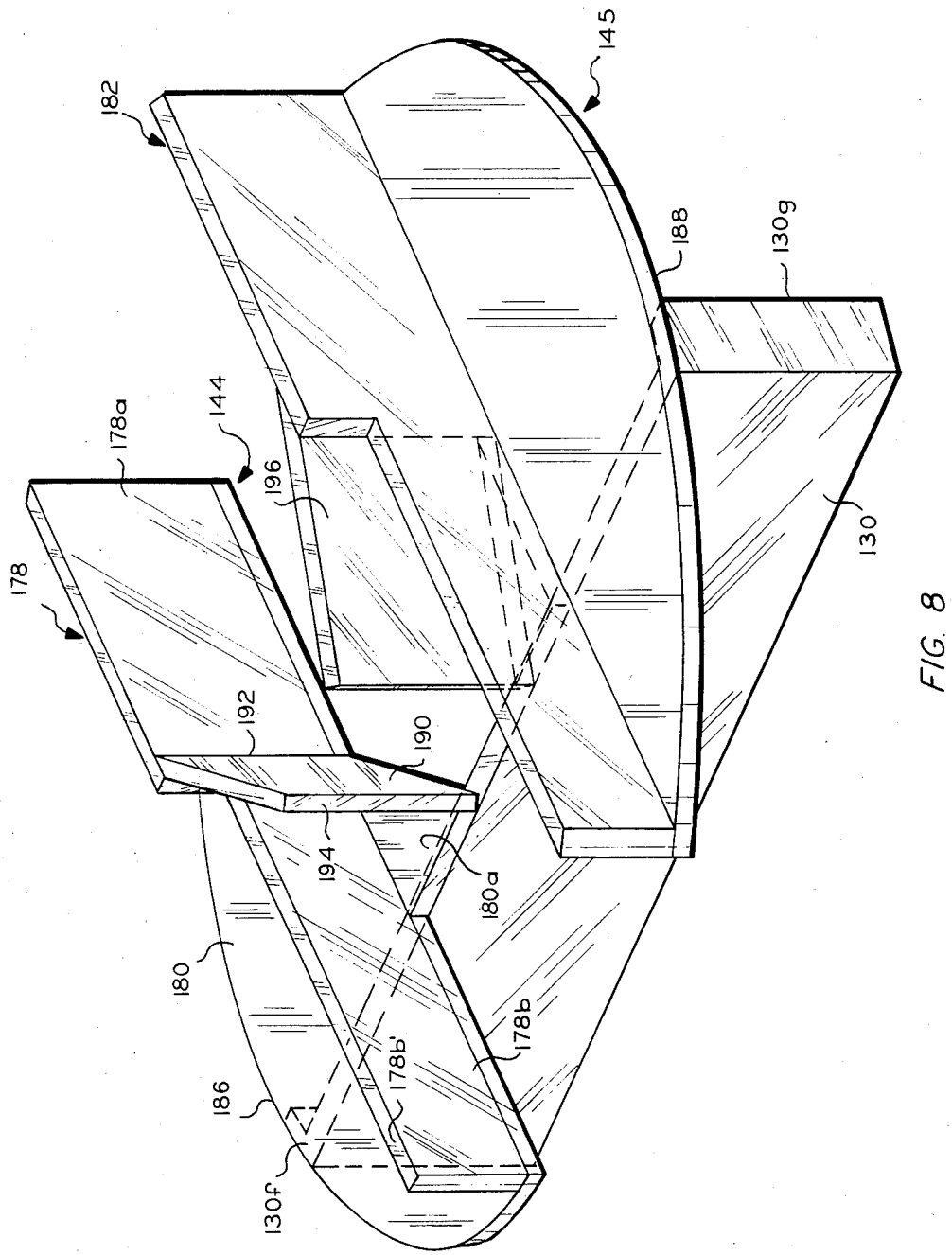

Referring to FIG. 8, a pictorial view is shown of the seal pans 144 and 145 and associated separation baffle plate 130 shown in FIGS. 5-7. Seal pan 144 includes a bottom wall 180 and one side wall 178, generally perpendicular to separation baffle 130, made up of side wall portions 178a and 178b. Only one side wall, and therefore only side wall upper edge 178b', is available as an overflow weir in the embodiment shown in FIG. 8. To partially compensate for this, side wall portions 178a and 178b join at a location which is not directly above the separation baffle 130 so as to be offset with respect to baffle 130, and an additional angled wall member 190 and bottom wall portion 180a is provided to direct liquid overflowing from the upper edge of portion 178b to the separation baffle plate 130. More specifically, wall member 190 is connected to and extends from bottom wall 180. Wall member 190 has a height approximately equivalent to the height of portion 178a. As shown, wall 190 is connected at a first end 192 to side wall 178 so as to define an angle between side wall 178 and wall 190. End 192 is connected to the side wall at the location where side wall portions 178a and 178b join. In addition, wall 190 horizontally extends from end 192 to a second end 194 which is closely adjacent to and directly overlies separation baffle 130. Seal pan 145 is similarly constructed, and includes a side wall 182 and wall member 196.

Seal pans 144 and 145 can be attached to the shell of the fractionator by welding along respective edges 186 and 184 of bottom wall 180. Similarly, separation baffle plate 130 can be attached by welding angularly displaced components 130f and g to the shell of the fractionator.

Separation baffle plate 130 and seal pans 144 and 145 cooperate to maintain a separation between cool liquids from the bottom tray and reboiler return liquids in a manner similar to that discussed with reference to FIGS. 1-4.

Obviously many modifications and variations of the present invention are possible in light of the above teachings. It is therefore to be understood that within the scope of the appended claims the invention may be practiced otherwise than as specifically described.

That which is claimed is:

1. In an apparatus for the fractional distillation of liquids of the type which includes a vertical hollow shell having a bottom end and an interior surface; at least a bottom tray within said shell; at least one downcomer associated with said bottom tray for guiding fluid downwardly therefrom; a surge baffle plate, having an upper edge, mounted within said shell and extending upwardly from said shell bottom end to said upper edge so as to divide a bottom portion of the shell interior into a first region and a second region; a reboiler capable of heating fluids introduced thereto and discharging heated fluids; first outlet means in communication with said first region through which liquids in said first region can be withdrawn and introduced to said reboiler; and a second outlet means in communication with said second region through which liquids in said second region can be withdrawn as bottoms product; the improvement comprising:
   a substantially vertical separation baffle plate mounted within said shell, said separation baffle plate having an upper edge and a lower edge, and also having first and second opposing surfaces each of which extend from said separation baffle lower edge to said separation baffle upper edge, wherein said separation baffle lower edge is positioned substantially entirely in said first region and vertically below said surge baffle plate upper edge so as to extend into said first region, and wherein said separation baffle plate upper edge is positioned vertically above said surge baffle plate upper edge;
   at least one seal pan for receiving liquid flowing from said downcomer, said seal pan comprising a bottom wall directly overlying at least a portion of said separation baffle plate upper edge and being closely adjacent thereto, said seal pan also comprising at least one side wall generally perpendicular to said separation baffle plate and having an upper edge at least a portion of which defines an overflow weir, said side wall extending generally vertically from said bottom wall to said side wall upper edge, and wherein said side wall is structured to direct substantially all liquid overflowing said side wall weir to a third region defined between said first surface and the shell interior surface, said overflowing liquid then flowing into said first region;.
   a shell inlet means for receiving therethrough heated fluids discharged from said reboiler, said inlet means being vertically spaced above said surge baffle plate upper edge and below said seal pan, said inlet means being positioned closely adjacent to and in fluid communication with a fourth region defined between said separation baffle plate second surface and said shell interior surface.

2. An apparatus as recited in claim 1, wherein said portion of said separation baffle plate upper edge is in contact with the bottom of said seal pan at said bottom wall.

3. An apparatus as recited in claim 2, wherein said separation baffle plate extends substantially entirely across the interior of said shell.

4. An apparatus as recited in claim 3, wherein said inlet means is horizontally positioned between said separation baffle plate and said surge baffle plate upper edge.

5. An apparatus as recited in claim 4, wherein said at least one side wall includes first and second side wall portions having respective first and second upper edges which together constitute said side wall upper edge, wherein said first side wall portion has a height as measured vertically less than the height of said second side wall portion, said first upper edge being said at least one side wall edge portion which defines said side wall overflow weir.

6. An apparatus as recited in claim 5, wherein at least a portion of said first side wall portion directly overlies said third region defined between said separation baffle plate first surface and said shell interior surface.

7. An apparatus as recited in claim 6, wherein said separation baffle plate second surface generally faces said surge baffle plate upper edge.

8. An apparatus as recited in claim 7, wherein said at least one seal pan includes two substantially parallel side walls, each side wall having first and second side wall portions.

9. An apparatus as recited in claim 8, wherein said at least one seal pan has two horizontally spaced ends, each end being connected to said shell interior surface.

10. An apparatus as recited in claim 9, wherein said first and second side wall portions are joined at a location closely adjacent to said separation baffle.

11. An apparatus as recited in claim 7, wherein said seal pan includes only one side wall, and wherein said seal pan also includes a wall member having a height approximately equivalent to the height of said second side wall portion, wherein said wall member is connected to and extends from the seal pan bottom wall, and wherein said wall member extends from a first end, connected to said side wall at a location where said side wall portions join, to a second end closely adjacent to and directly overlying said separation baffle, an angle being defined between said side wall and said wall member.

12. An apparatus as recited in claim 11, wherein said seal pan bottom wall includes an outer edge which is connected to said shell interior surface.

13. An apparatus as recited in claim 10, wherein a plurality of seal pans are provided spaced along said separation baffle plate upper edge.

14. An apparatus as recited in claim 12, wherein a plurality of seal pans are provided spaced along said separation baffle plate upper edge.

15. An apparatus for use in a fractionation column comprising:
   a generally cylindrical, vertically oriented shell having an interior surface;
   a plate having at least one edge; and
   at least one pan having horizontally spaced ends attached to said shell interior surface such that said pan generally horizontally extends entirely across the interior of said shell, wherein said pan comprises a bottom wall having first and second opposing surfaces, at least a portion of said plate edge being in contact with said bottom wall at said first surface such that said bottom wall is generally perpendicular to said plate, said pan also comprising at least one side wall connected to said bottom wall and extending from said bottom wall second surface to a side wall edge, said side wall being generally perpendicular to said plate, and wherein said side wall includes two side wall portions having respective edges which together constitute said side wall edge and wherein one side wall portion has a height as measured along a line parallel to said plate and said side wall less than the height of the other side wall portion.

16. An apparatus as recited in claim 15, wherein said at least one pan includes two substantially parallel side walls.

17. An apparatus as recited in claim 16, wherein said side wall portions join at a location closely adjacent to said plate edge and wherein said plate edge is positioned intermediate the ends of said pan.

18. An apparatus as recited in claim 15, wherein said at least one pan includes only one side wall and wherein said pan also includes a wall member having a height approximately equivalent to the height of said other side wall portion, said wall member being connected to and extending from said bottom wall, and wherein said wall member extends from a first end, connected to said side wall at a location where said side wall portions join, to a second end closely adjacent to said plate, an angle being defined between said wall member and said side wall.

19. An apparatus as recited in claim 17, wherein a plurality of pans are provided which are spaced from one another along said plate edge.

20. An apparatus as recited in claim 18, wherein a plurality of pans are provided spaced along said plate edge.

21. In a method for the fractional distillation of liquids in a fractionation column of the type which includes a hollow vertical shell, at least a bottom tray within the shell, a plurality of downcomers for guiding fluid downwardly from the bottom tray, and a surge baffle plate mounted within the shell which extends from the bottom end of the shell to a surge baffle plate upper edge so as to divide a bottom portion of the shell interior into a first region and a second region, the improvement comprising:

introducing the liquids from each downcomer to a corresponding seal pan;

flowing substantially all liquids overflowing from each seal pan so as to be directed to a third region defined between a first surface of a single vertical separation baffle plate and the shell interior surface, said liquids then flowing to said first region, wherein said separation baffle plate has a lower edge positioned below said surge baffle plate upper edge and an upper edge spaced above said surge baffle plate upper edge;

withdrawing at least a portion of liquid in the first region;

passing said withdrawn liquid portion through a reboiler, said reboiler discharging heated fluids;

introducing said heated fluids from the reboiler into a fourth region in the shell interior defined between a second separation baffle surface, opposite the first surface, and the shell interior surface, said heated fluids being introduced from a position below the seal pans and spaced above the surge baffle plate upper edge;

withdrawing at least a portion of liquid in said second region, said liquid so withdrawn being bottoms product of said column.

22. A method as recited in claim 21, wherein said position from which heated fluids are introduced to the shell interior is located between said surge baffle plate upper edge and said separation baffle plate.

23. A method as recited in claim 22, wherein the liquid level in said first region is maintained even with said surge baffle plate upper edge.

24. An apparatus as recited in claim 1 wherein said at least one side wall includes first and second side wall portions having respective first and second upper edges which together constitute said side wall upper edge, wherein said first side wall portion has a height as measured vertically less than the height of said second side wall portion, said first upper edge being said at least one side wall edge portions which defines said side wall overflow weir.

* * * * *